C. HOLDING.
HOG HOLDING DEVICE.
APPLICATION FILED JAN. 22, 1920. RENEWED APR. 15, 1921.
1,398,484.
Patented Nov. 29, 1921.
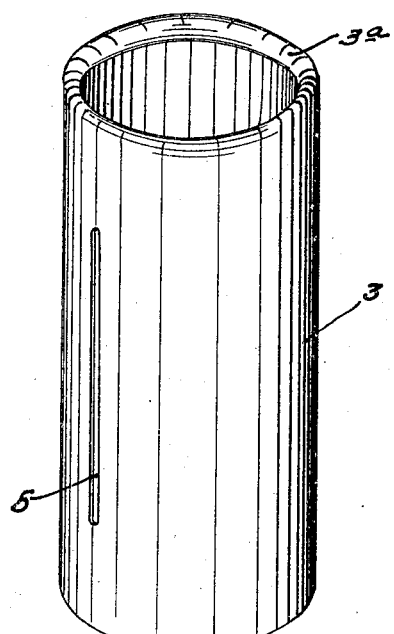
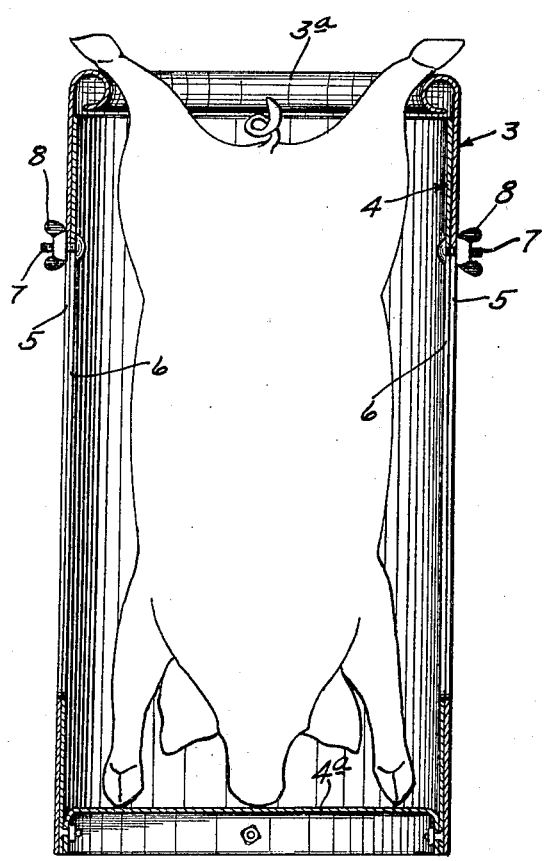
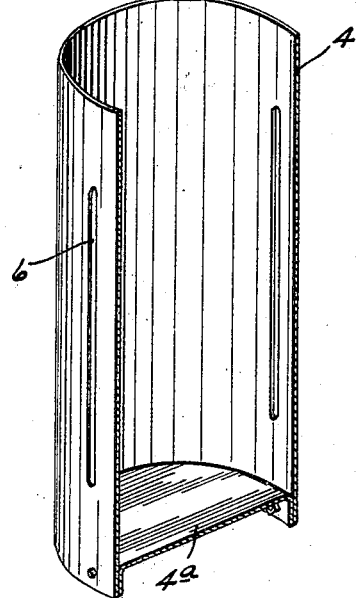
Inventor
Chester Holding
By his Attorneys

UNITED STATES PATENT OFFICE.

CHESTER HOLDING, OF NEW RICHMOND, WISCONSIN.

HOG-HOLDING DEVICE.

1,398,484.  Specification of Letters Patent.  Patented Nov. 29, 1921.

Application filed January 22, 1920, Serial No. 353,257. Renewed April 15, 1921. Serial No. 461,652.

*To all whom it may concern:*

Be it known that I, CHESTER HOLDING, a citizen of the United States, residing at New Richmond, in the county of Saint Croix and State of Wisconsin, have invented certain new and useful Improvements in Hog-Holding Devices; and I do hereby declare the following to be a full, clear, and exact description of the invention, such as will enable others skilled in the art to which it appertains to make and use the same.

My invention has for its object to provide a simple and efficient device for holding hogs for the purpose of castrating the same, and to such ends, the invention consists of the novel devices and combinations of devices hereinafter described and defined in the claims.

The device is illustrated in the accompanying drawings wherein like characters indicate like parts throughout the several views.

Referring to the drawings:

Figure 1 is an axial section of the device showing a hog therein in an inverted position; and Fig. 2 is a perspective view, partly in full and partly in axial section, showing the cylindrical sections of the device drawn apart.

The device comprises two cylindrical sections 3 and 4, the former of which is telescoped over the latter. Section 3 is open at both ends and at its outer end is bent inward to form a rounded rim 3ª. Section 4 is closed at one end by a bottom forming head 4ª.

The two sections 3 and 4 are formed with co-incident longitudinal slots 5 and 6 through which are passed clamping bolts 7 provided with thumb nuts 8.

In the use of the device, the hog can be coaxed into the telescoped shell, while the same is turned horizontally by throwing a little corn into the shell, then the shell will be turned vertically, as shown in Fig. 1, and the hog thus caught will rest with his nose and front feet on the bottom 4ª and, moreover, in an attempt to keep his balance and to hold himself, will spread his hind legs and hold them against the rim 3ª, thus giving the best possible opportunity for performing the operation.

For hogs that vary greatly in size the holder will be made in different sizes; but a holder of one size will be found readily adaptable to hogs that vary considerably in size. The device should be adjusted longitudinally to approximate the length of the particular hog to be handled.

The device, while very simple and of small cost, has, in actual practice been found remarkably efficient for the purposes had in view.

What I claim is:

1. A device for holding hogs for the purposes stated, in the form of a tubular shell closed at one end and having a rounded rim at its other end, said shell being made up of telescoped sections making the same longitudinally adjustable.

2. A device for holding hogs for the purposes stated, in the form of a tubular shell closed at one end and having a rounded rim at its other end, said shell being made up of telescoped sections making the same longitudinally adjustable, and said sections having longitudinal slots and nut equipped bolts working in said slots for securing the sections in different adjustments.

In testimony whereof I affix my signature in presence of two witnesses.

CHESTER HOLDING.

Witnesses:
RILLA E. HETHERINGTON,
C. H. SPERBECK.